US009026460B2

(12) United States Patent
Grigg et al.

(10) Patent No.: US 9,026,460 B2
(45) Date of Patent: May 5, 2015

(54) AUTOMATIC ACTIVATION OF MOBILE PAYMENT MECHANISMS BASED ON IDENTIFIED MOBILE PAYMENT TYPES ACCEPTED BY A MERCHANT

(75) Inventors: David M. Grigg, Rock Hill, SC (US); Alicia C. Jones, Fort Mill, SC (US); Matthew A. Calman, Charlotte, NC (US); Susan Smith Thomas, Gastonia, NC (US)

(73) Assignee: Bank of America Corporation, Charlotte, NC (US)

( * ) Notice: Subject to any disclaimer, the term of this patent is extended or adjusted under 35 U.S.C. 154(b) by 173 days.

(21) Appl. No.: 13/536,783

(22) Filed: Jun. 28, 2012

(65) Prior Publication Data
US 2014/0006183 A1    Jan. 2, 2014

(51) Int. Cl.
| G06Q 20/00 | (2012.01) |
| G06Q 20/20 | (2012.01) |
| G06Q 20/32 | (2012.01) |
| G06Q 40/02 | (2012.01) |

(52) U.S. Cl.
CPC ............... G06Q 20/20 (2013.01); *G06Q 40/02* (2013.01); G06Q 20/322 (2013.01); G06Q 20/3224 (2013.01); G06Q 20/3278 (2013.01)

(58) Field of Classification Search
USPC .................................. 705/17, 26.1, 26.82, 40
See application file for complete search history.

(56) References Cited

U.S. PATENT DOCUMENTS

| 8,249,961 B1 * | 8/2012 | Hopkins ........................... 705/34 |
| 2005/0256802 A1 * | 11/2005 | Ammermann et al. ......... 705/44 |
| 2011/0247063 A1 * | 10/2011 | Aabye et al. ..................... 726/6 |
| 2011/0251892 A1 * | 10/2011 | Laracey ..................... 705/14.51 |
| 2012/0016731 A1 * | 1/2012 | Smith et al. ................ 705/14.33 |
| 2012/0252359 A1 * | 10/2012 | Adams et al. ................ 455/41.1 |

FOREIGN PATENT DOCUMENTS

WO    WO2012042262 A1 *    4/2012

* cited by examiner

*Primary Examiner* — Matthew Gart
*Assistant Examiner* — Rokib Masud
(74) *Attorney, Agent, or Firm* — Michael A. Springs; Moore & Van Allen PLLC; James C. Edwards

(57) ABSTRACT

Systems, methods, and computer program products are provided for automatic activation of mobile payment mechanisms (e.g., software applications, devices/hardware and the like) on a mobile communication device in response to automated determination of the mobile payment types accepted by a merchant at which the user/consumer is located. As such, the present invention serves to automatically make the user/consumer aware of an option for mobile payment. In addition, the mobile payment transaction is made more efficient, in that, the user/consumer does not have to manually configure and/or activate the software or hardware associated with the mobile payment type.

15 Claims, 3 Drawing Sheets

AUTOMATIC ACTIVATION OF MOBILE PAYMENT MECHANISMS BASED ON IDENTIFIED MOBILE PAYMENT TYPES ACCEPTED BY A MERCHANT

FIELD

In general, embodiments herein disclosed relate to commerce and, more specifically, automatically activating mobile payment mechanisms on a mobile communication device based on an automatic determination of the mobile payment type(s) accepted by the merchant at which the mobile communication device user is currently located.

BACKGROUND

Mobile payment, also referred to as mobile money, mobile banking or mobile wallet, allows for the user/customer to conduct a transaction (i.e., pay for goods or services) using their mobile communication device as the payment vehicle as opposed to conventional means for payment (e.g., cash, credit/debit card, check or the like). Many different types of mobile payment are currently in use or will be in use in the future. For example, short range wireless communication, such as Near Field Communication (NFC), Wi-Fi, Bluetooth® or the like, allows for mobile payment via mobile communication device's equipped with requisite short range wireless communication functionality, such as a NFC chip (or some other close-range wireless protocol chip). The NFC or other short range wireless functionality provides for the mobile communication device to wirelessly exchange payment credentials in a secure environment with a corresponding point-of sale (POS) terminal, which is also configured with the requisite short range wireless functionality.

In another example, visual indicia exchange may be implemented between the mobile communication device and the payment terminal. For example, the POS terminal may display computer readable-indicia, for example computer readable-indicia, such as a barcode, Quick Response (QR) code or the like, which is captured by the mobile communication device via an image capture mechanism (i.e., a camera or the like) embodied with the mobile communication device. In response to receipt and processing of the computer readable-indicia, the mobile communication device will communicate payment credentials to the POS. In specific example, the mobile communication device may generate and displays another computer readable-indicia, which includes the customer's payment credentials and is subsequently captured by the POS terminal.

In a related example, computer readable-indicia may be implemented in conjunction with cloud storage of the customer's credentials. In such an example, the POS terminal may display computer readable-indicia, such as a barcode, Quick Response (QR) code or the like, which is captured by the mobile communication device and provides for the mobile communication device to connect with the cloud. Once the mobile and the POS terminal have connected with the cloud, secure key exchange provides the authentication for the customer's payment credentials to be communicated form the cloud storage to the POS terminal.

The various different mobile payment types all require the mobile communication device and/or the related payment applications to perform functions that are specific to the mobile payment type. For example, Short-range communication, such as NFC requires activation of the short-range/NFC chip for broadcasting such communications, indicia capturing requires activation of the image capturing device (i.e., camera) and the like. In practice, the customer may be unaware of which type(s) of mobile payment type a merchant accepts until they are about to conduct the payment transaction (i.e., at that the POS terminal). An inefficiency is realized in terms of overall transaction time, if the customer is required to manually configure the mobile communication device for mobile payment of the type accepted by the retailer when the customer is about to conduct a transaction (i.e., at the POS terminal). Moreover, if the customer, within a short period of time, is unable to manually configure their mobile communication device at the POS terminal, the customer may forego a mobile payment and resort to conventional payment means (i.e., cash, check, credit/debit or the like).

Therefore, a need exists for a more efficient means of conducting mobile payments. The invention should take into account that various different mobile payment types or platforms may be implemented by different retailers or merchants and that the consumer/user is often unaware of the type of mobile payment accepted by the merchant until they are at the POS terminal, ready to conduct a transaction. Moreover, the present invention should eliminate the need for the consumer to manually activate applications and devices associated with the merchant's mobile payment type, thereby further expediting the overall mobile payment process.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

Mobile communication devices, systems and computer program products are defined that provide for automatic activation of mobile payment mechanisms (e.g., software applications, devices/hardware and the like) on a mobile communication device in response to automated determination of the mobile payment types accepted by a merchant at which the user/consumer is located. In one embodiment location determining mechanisms, such as Global Positioning System (GPS) devices are implemented on the mobile communication device to determine the geographic location of the mobile determine and identify a merchant/retailer associated with the location. Once the merchant has been identified, the mobile communication network communication determines the mobile payment type(s) accepted by the merchant by accessing an internally stored mobile payment type database or a network-based mobile payment type database. In response to determining the mobile payment type(s) accepted by the merchant, the mobile communication device automatically activates the mobile payment mechanisms associated with mobile payment type.

In this regard, the present invention serves to make the user/consumer aware of an option for a conducting a transaction using the mobile payment type(s) accepted by the merchant. In addition, the mobile payment transaction is made more efficient, in that, the user/consumer does not have to manually configure and/or activate the software or hardware associated with the mobile payment type.

A mobile communication device configured for automated activation of mobile payment mechanisms defines first embodiments of the invention. The mobile communication device includes a computing platform including a memory and at least one processor in communication with the memory. The mobile communication device further includes a mobile payment activation module that is executable by the processor. The mobile payment activation module is configured to determine one or more mobile payment types accepted by an identified merchant and, in response to determination of the one or more payment types, automatically activate, on the mobile communication device, one or more mobile payment mechanisms associated with at least one of the determined one or more mobile payment types.

In further embodiments of the mobile communication device, the mobile payment activation routing is further configured to determine a geographic location of the mobile communication device and identify the merchant based on the geographic location of the mobile communication device. In alternate embodiments, the user may identify the merchant through user input.

In other specific embodiments of the mobile communication device, wherein the mobile payment activation module is further configured to determine the one or more mobile payment types by accessing a payment type database that indicates the one or more mobile payments types accepted by the merchant. In specific embodiments the payment type database may be a comprehensive, network-based, mobile payment type database that requires the wireless communication by the mobile communication device to access the database, while in other embodiments the database may be stored locally on the mobile communication device and include merchants that have been historically visited by the user or at which the user has conducted transactions.

In specific embodiments of the mobile communication device, the mobile payment activation module is further configured to activate a short-range wireless communication mechanism capable of broadcasting associated short-range wireless communication, based on a determination that the mobile payment type accepted by the merchant is a short-range wireless communication mobile payment type. While in other specific embodiments of the mobile communication device, the mobile payment activation module is further configured to activate an image capture mechanism (e.g., a camera) capable of capturing computer readable-indicia displayed at a Point-of-Sale (POS) terminal, based on a determination that the mobile payment type accepted by a merchant is image capturing-related.

In still further embodiments of the mobile communication device, the mobile payment activation module is further configured to determine that the merchant accepts two or more mobile payment types. In such embodiments of the invention, he mobile payment activation module is further configured which of the mobile payment types are implemented by the mobile communication device. If two or more mobile payment types are implemented by the mobile communication device, the mobile payment activation module is further configured to activate, on the mobile communication device, the one or more mobile payment mechanisms associated with a preferred mobile payment type, wherein the preferred mobile payment type is based on one of user configuration or merchant preference. In other related embodiments, in which the mobile payment activation module determines that the merchant accepts two or more mobile payment types, the mobile payment activation module may be further configured to display a prompt for a user to select one of the two or more mobile payment types accepted by the merchant, wherein user selection of one of the mobile payment types automatically activates at least one mobile payment mechanisms associated with the selected mobile payment type.

A system for automated activation of mobile payment mechanisms provides for second embodiments of the invention. The system includes a mobile payment type database configured to store a listing of merchants and the one or more mobile payment types accepted by each merchant. The system further includes a mobile communication device comprising a computing platform having a memory and at least one processor in communication with the memory. The mobile communication device includes a location-determining device configured to determine a geographic location of the mobile communication device. In addition the mobile communication device includes a mobile payment activation module stored in the memory, executable by the processor and configured to (1) identify a merchant associated with the determined geographic (2) access the mobile payment type database to identify one or more mobile payment types accepted by the merchant and, in response to identifying the one or more payment types, (3) automatically activate one or more mobile payment mechanisms associated with at least one of the identified one or more mobile payment types.

In specific embodiments of the system the mobile payment type database may be a network-based database accessible to the mobile communication device via wireless communication. In such embodiments, the mobile payment type database is further configured to learn, and store, a mobile payment type associated with a merchant by one of merchant contact information, customer transactions or crowd sourcing. In other embodiments, mobile payment type database may be stored locally on the mobile communication device and the database may learn, and store, mobile payment type based on the historical mobile payment transactions conducted by the mobile communication device.

In other specific embodiments of the system, the mobile payment activation module is further configured to activate a short-range wireless communication mechanism capable of broadcasting associated short-range wireless communication, based on a determination that the mobile payment type accepted by a merchant is a short-range wireless communication mobile payment type. While in other specific embodiments of the system, the mobile payment activation module is further configured to activate an image capture mechanism capable of capturing computer readable-indicia displayed at a Point-of-Sale (POS) terminal, based on a determination that the mobile payment type accepted by a merchant is image capturing-related.

In still further embodiments of the system, the mobile payment activation module is further configured to determine that the merchant accepts two or more mobile payment types. In such embodiments of the invention, he mobile payment activation module is further configured which of the mobile payment types are implemented by the mobile communication device. If two or more mobile payment types are implemented by the mobile communication device, the mobile payment activation module is further configured to activate, on the mobile communication device, the one or more mobile payment mechanisms associated with a preferred mobile payment type, wherein the preferred mobile payment type is based on one of user configuration or merchant preference. In other related embodiments, in which the mobile payment activation module determines that the merchant accepts two or more mobile payment types, the mobile payment activation module may be further configured to display a prompt for a user to select one of the two or more mobile payment types accepted by the merchant, wherein user selection of one of the mobile payment types automatically activates at least one mobile payment mechanisms associated with the selected mobile payment type.

A computer program product including a non-transitory computer-readable medium defines third embodiments of the invention. The computer-readable medium includes a first set of codes for causing a mobile communication device to determine one or more mobile payment types accepted by an identified merchant. The computer-readable medium additionally includes a second set of codes for causing the mobile communication device, in response to determination of the one or more payment types, to automatically activate, on the mobile communication device, one or more mobile payment mechanisms associated with at least one of the determined one or more mobile payment types.

In additional embodiments the computer program product includes a third set of codes for causing the mobile communication device to determine a geographic location of the mobile communication device and identify the merchant based on the geographic location of the mobile communication device.

Thus, as described in more details below, systems, devices and computer program are defined that provide for automatic activation of mobile payment mechanisms (e.g., software applications, devices/hardware and the like) on a mobile communication device in response to automated determination of the mobile payment types accepted by a merchant at which the user/consumer is located. As such, the present invention serves to automatically make the user/consumer aware of an option for mobile payment. In addition, the mobile payment transaction is made more efficient, in that, the user/consumer does not have to manually configure and/ or activate the software or hardware associated with the mobile payment type.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
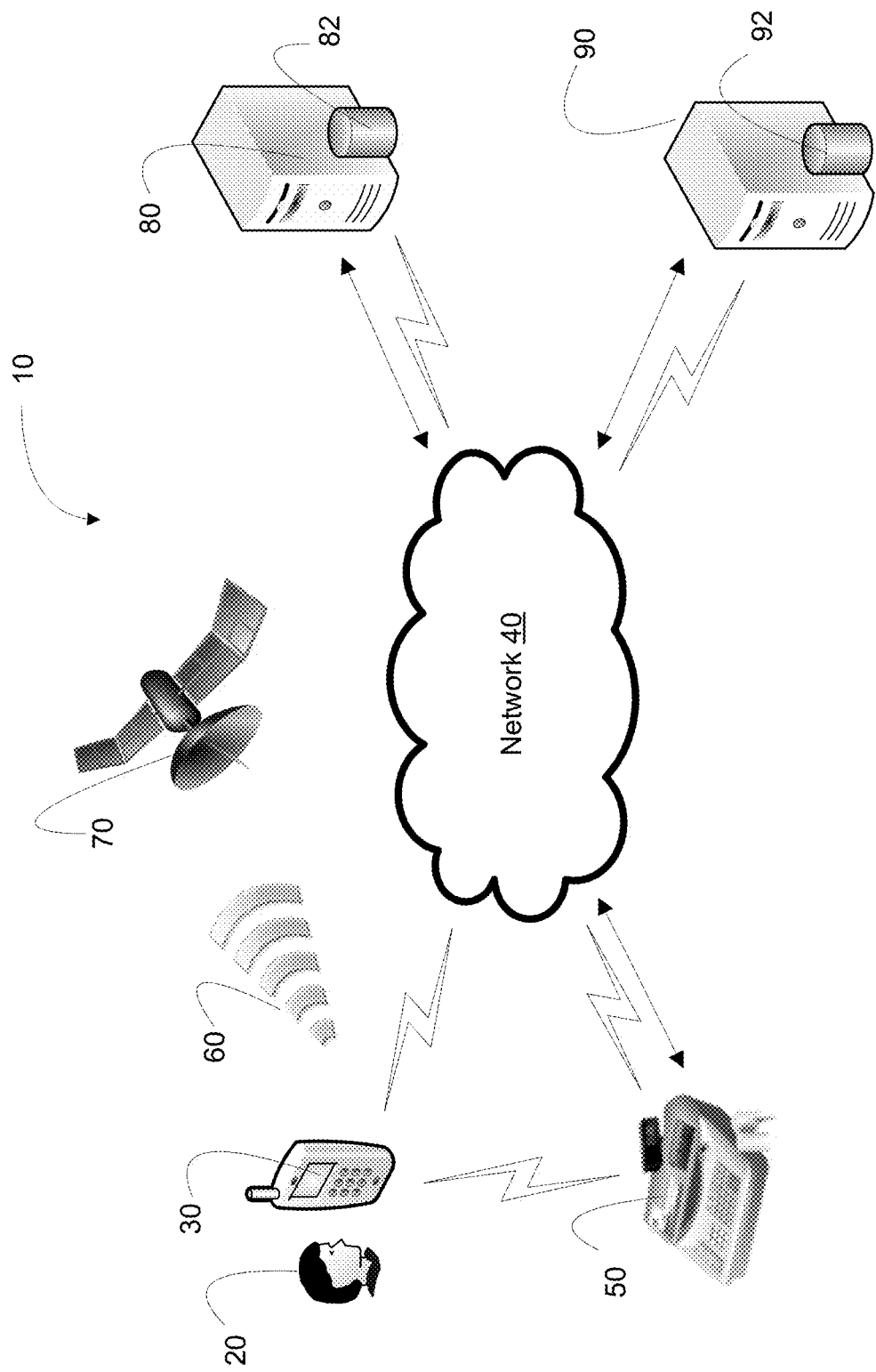
Figure 2:
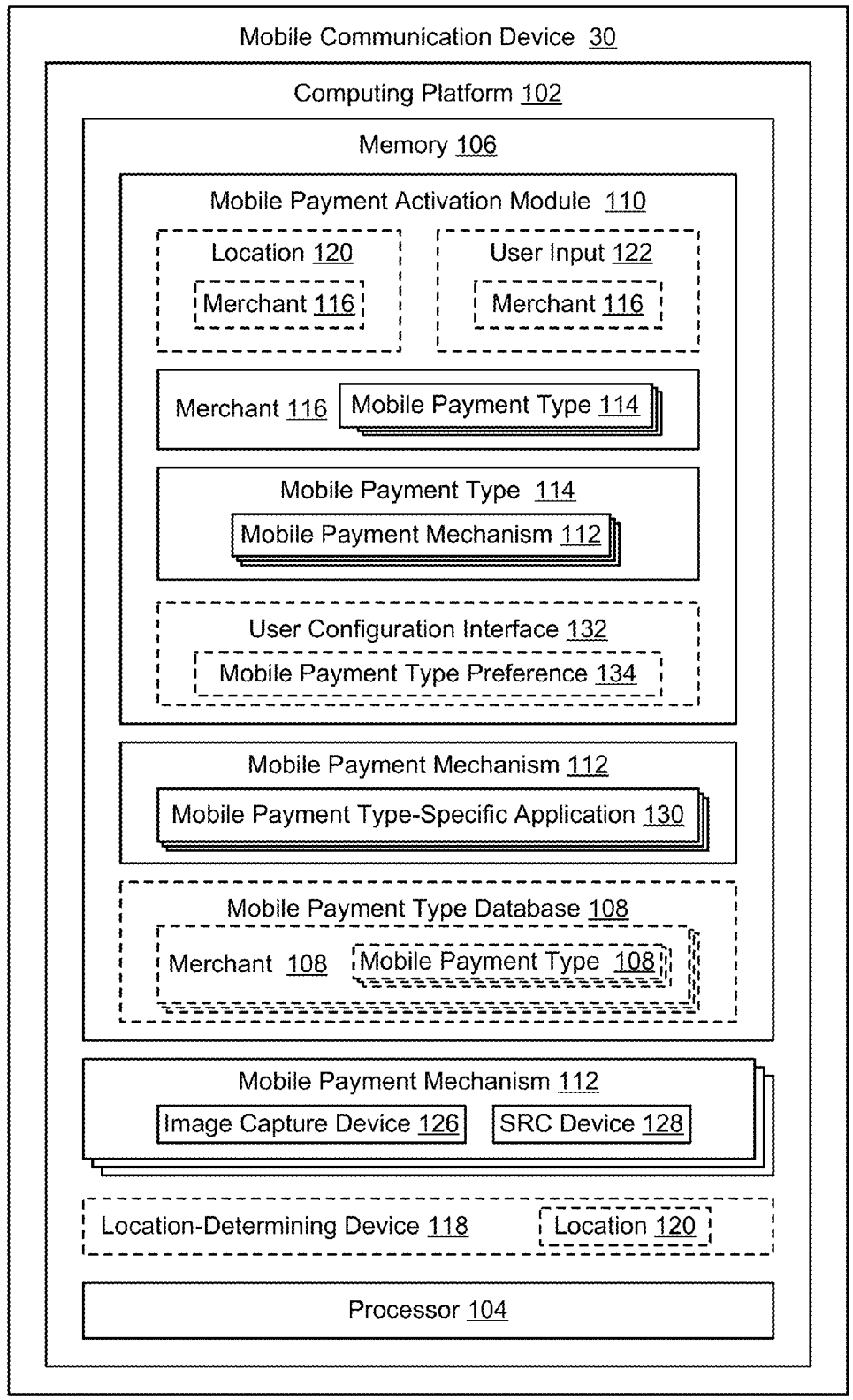
Figure 3:
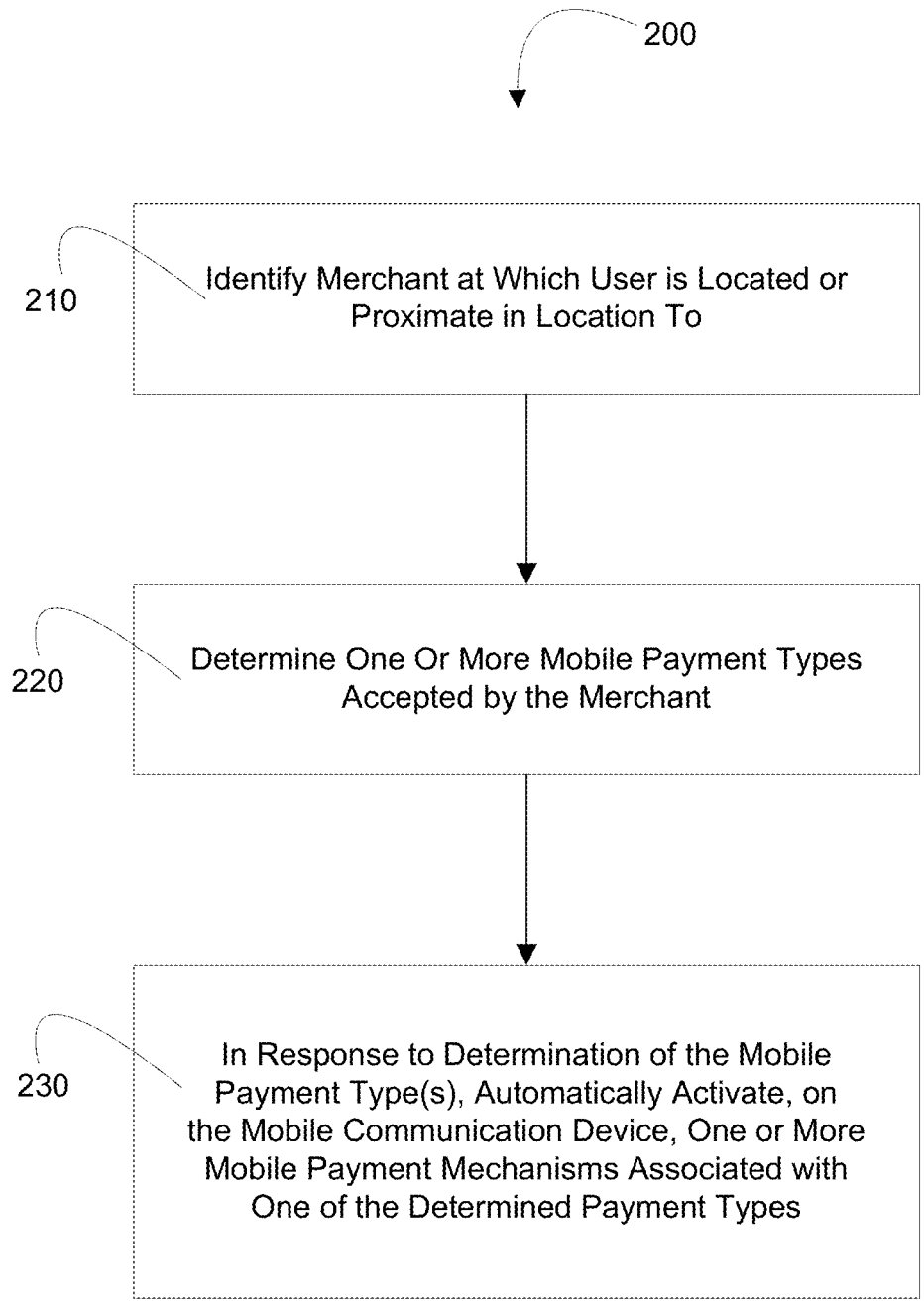

Having thus described embodiments of the invention in general terms, reference will now be made to the accompanying drawings, which are not necessarily drawn to scale, and wherein:

FIG. 1 is a schematic diagram of a system for automatically activating mobile payment mechanisms based on automated identification of the mobile payment types accepted by a merchant, in accordance with one embodiment of the present invention;

FIG. 2 is a block diagram of a mobile communication device configured for automatic activation of mobile payment mechanisms based on automated identification of the mobile payment types accepted by a merchant, in accordance with one embodiment of the present invention; and FIG. 3 is a flow diagram of a method for automatically activating mobile payment mechanisms based on automated identification of the mobile payment types accepted by a merchant, in accordance with an embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout.

Various embodiments or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The steps and/or actions of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some embodiments, the processor and the storage medium may reside in an Application Specific Integrated Circuit (ASIC). In the alternative, the processor and the storage medium may reside as discrete components in a computing device. Additionally, in some embodiments, the events and/or actions of a method or algorithm may reside as one or any combination or set of codes and/or instructions on a machine-readable medium and/or computer-readable medium, which may be incorporated into a computer program product.

In one or more embodiments, the functions described may be implemented in hardware, software, firmware, or any combination thereof. If implemented in software, the functions may be stored or transmitted as one or more instructions or code on a computer-readable medium. Computer-readable media includes both computer storage media and communication media, including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures, and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. "Disk" and "disc", as used herein, include compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

Thus, systems and computer program products are defined that provide for automatic activation of mobile payment mechanisms (e.g., software applications, devices/hardware and the like) on a mobile communication device in response to automated determination of the mobile payment types accepted by a merchant at which the user/consumer is located. In one embodiment location determining mechanisms, such as Global Positioning System (GPS) devices are implemented on the mobile communication device to determine the geographic location of the mobile determine and identify a merchant/retailer associated with the location. Once the merchant has been identified, the mobile communication network communication determines the mobile payment type(s) accepted by the merchant by accessing an internally stored mobile payment type database or a network-based mobile payment type database. In response to determining the mobile payment type(s) accepted by the merchant, the mobile communication device automatically activates the mobile payment mechanisms associated with mobile payment type.

In this regard, the present invention serves to make the user/consumer aware of an option for a conducting a transaction using the mobile payment type(s) accepted by the merchant. In addition, the mobile payment transaction is made more efficient, in that, the user/consumer does not have to manually configure and/or activate the software or hardware associated with the mobile payment type.

Referring to FIG. 1 a block diagram is provided of a system 10 for automatically activating mobile payment mechanisms in response to automated identification of mobile payment types accepted by a merchant; in accordance with embodiments of the present invention. The system 10 includes a user/consumer 20 in possession of a mobile communication device 30, such as a cellular/wireless telephone or the like configured to provide for wireless communication via network 40. In addition, mobile communication device 30 is configured to provide for conducting mobile payment (otherwise referred to as mobile wallet, mobile money, mobile money transfer and the like) implementing one, and in many instances more than one, mobile payment type (e.g., short-range wireless communication, image/code capture communication or the like). Mobile payment provides for the user's payment credentials (e.g., payment account number, authentication attributes and the like) to be wirelessly communicated from the mobile communication device or an intermediary (e.g., a cloud) to a corresponding Point-Of-Sale (POS) terminal 50 configured to accept mobile payment of the corresponding mobile payment type.

In accordance with embodiments of the invention, the mobile communication device 30 is configured to identify a merchant. In specific embodiments the mobile communication device is configured to automatically identify a merchant at which the user 20, in possession of the mobile communication device 30, is currently located or is proximate in location. In such embodiments, the mobile communication device includes a location-determining device, such as a Global Positioning System (GPS) device or the like, which provides for broadcasting signals 60 to a plurality of location-determining satellites 70 to determine the current location of the mobile communication device 30. The mobile communication device 30 is additionally in communication, via network 40, with a network device 80 that includes a mapping database 82 configured to identify the merchant located at or proximate to the current location of the mobile communication device 30.

In other embodiments of the invention, the merchant may be identified by user 20 input (via a mobile payment user-interface or the like) or the merchant may be identified by receipt of wireless communication or capture of images/codes which identify the merchant.

Once the merchant has been identified, the mobile communication device 30 determines one or more mobile payment types accepted by the merchant. Such a determination may be conducted by communicating, via network 40, with a network device 90 that stores a comprehensive mobile payment type database 92 that maps merchants to the mobile payment type(s) accepted by the merchant. The comprehensive database may be dynamically updated to reflect the current mobile payment types accepted by merchants. Such dynamic update may be accomplished via crowd sourcing (i.e., user/consumer inputs based on experience with a merchant), actual user/consumer transaction data, known merchant information provided by merchants or the like.

In other embodiments the determination of the mobile payment types accepted by a merchant may be conducted by accessing an internal mobile payment database (not shown in FIG. 1) stored locally on the mobile communication device. The internal mobile payment database may store mobile payment types for all merchants that the user 20 has previously conducted a mobile payment transaction. In one specific embodiment of the invention, determination of the mobile payment types accepted by a merchant may provide for accessing the internal mobile payment database and, if the internal database does not include currently include information pertaining to the merchant of interest, subsequently communicating with the network-based comprehensive mobile payment type database.

In response to determining one or more mobile payment types accepted by the merchant, the mobile communication device 30 automatically activates one or more mobile payment mechanisms, if the mobile communication device supports (includes the requisite hardware and/or software) at least one of the one or more mobile payment type(s) accepted by the merchant. In the event that the merchant only accepts one type of mobile payment, the mobile communication device activates one or more mobile payment mechanisms (e.g., related hardware, software, firmware or the like) associated with the mobile payment type. For example, if the mobile payment type accepted by the merchant is of a short-range wireless communication type, such as NFC or like, activation of the mobile payment mechanisms includes activation of the short-range wireless device (e.g., an NFC chip) to allow for broadcasting the short-range wireless signals necessary for communicating payment credentials from the mobile communication device 20 to the POS terminal 50. In another example, if the mobile payment type accepted by the merchant is of an image capture type, such as QR code, barcode or the like, activation of the image capturing device (e.g., camera) and a related software application that displays a prompt directing the user 20 to capture the requisite image/code.

In those embodiments in which the merchant accepts two or more mobile payment types and the mobile communication device supports at least two of the mobile payment types, the mobile payment mechanisms activated may be predetermined by user configuration or merchant configuration, such that, the user 20 may prefer one mobile payment type versus other mobile payment types or the merchant may prefer that the user 20 use a preferred mobile payment type. In alternate embodiments, a user prompt may be displayed directing the user 20 to select from the two or more mobile payment types accepted by the merchant and, upon selection of a mobile payment type, automatic activation of the related mobile payment mechanisms occurs. Alternatively, a user prompt may be displayed directing the user to confirm the previously configured user preference or to override the previous preferred user preference and select from the two or more mobile payment types accepted by the merchant.

In the event that the merchant is determined to not accept any mobile payment or not accept a mobile payment type implemented by the mobile communication device, in lieu of activating mobile payment mechanisms, an alert, such as a prompt, audible signal or the like, may be communicated to the user via the mobile communication device, notifying the user that some other form of payment (cash, check, credit/debit card or the like) will need to be used to conduct a transaction with the merchant.

In most embodiments, automatic activation of the mobile payment mechanisms associated with a mobile payment type accepted by the merchant will not coincide with initiation of the mobile payment process. This is because in most embodiments, the user 20 will be required to take some other overt action, such as authorize payment, capture an image/code or the like to initiate or consummate the payment transactions. However, in other embodiments of the invention automatic activation of the mobile payment mechanisms may indeed initiate the mobile payment process.

Referring to FIG. 2, a block diagram is depicted of an mobile communication device 30 configured for automatic activation of one or more mobile payment mechanisms in response to a determination of one or more mobile payment types accepted by a merchant, in accordance with embodiments of the present invention. The mobile communication device 30 includes a computing platform 102 having one or more processors 104 and a memory 106 in communication with the processor(s) 104. The memory 106 may comprise volatile and non-volatile memory, such as read-only and/or random-access memory (RAM and ROM), EPROM, EEPROM, flash cards, or any memory common to computer platforms. Further, memory 106 may include one or more flash memory cells, or may be any secondary or tertiary storage device, such as magnetic media, optical media, tape, or soft or hard disk.

Further, computing platform 102 also includes processor 104, which may be an application-specific integrated circuit ("ASIC"), or other chipset, processor, logic circuit, or other data processing device. Processor 104 or another processor such as ASIC may execute an application programming interface ("API") (not shown in FIG. 2) that interfaces with any resident programs, such as mobile payment activation module 110 or the like stored in the memory 106 of the apparatus 100.

Processor 104 may include various processing subsystems (not shown in FIG. 2) embodied in hardware, firmware, software, and combinations thereof that enable the functionality of mobile communication device 30 and the operability of the device 30 on wireless network. For example, processing subsystems allow for initiating and maintaining communications and exchanging data with other devices in the network. For the disclosed aspects, processing subsystems of processor 104 may include any subsystem used in conjunction with mobile payment activation module 110 or subcomponents or sub-modules thereof.

The memory 106 of mobile communication device 30 includes mobile payment activation module 110 configured to automatically activate one or more mobile payment mechanisms 112 (e.g., software, hardware, firmware or the like) in response to identification of the mobile payment type(s) 114 accepted by a merchant 116, in accordance with embodiments of the present invention.

In addition, the mobile payment activation module 110 may be configured to identify a merchant 116 at which the user, in possession of the mobile communication device 30, is currently located or is proximate in location. In such embodiments, the mobile communication device 30 includes a location-determining device 118, such as a Global Positioning System (GPS) which provides for broadcasting signals to a plurality of location-determining satellites to determine the current location 120 of the mobile communication device 30. Once the current location 120 has been determined, the mobile payment activation module 110 or some other routine/module/application executable on the mobile communication device may identify the merchant 116 associated with the location. For example, the mobile communication device 30 may access a network-based mapping database (not shown in FIG. 2), which maps the geographic location to a merchant. In other embodiments of the invention the merchant 116 may be identified by other automated or non-automated means. For example, the mobile communication device 30 may be configured to receive wireless communication from the merchant that is configured to identify the merchant 116 or the user of the mobile communication device may capture images/codes at the merchant 116 that identifies the merchant 116. Additionally, the merchant 116 may be identified by user input 122 to a merchant-identifying user interface.

The mobile payment activation module 108 is further configured to identify the mobile payment type or types accepted by the merchant. In specific embodiments, the mobile payment activation module accesses a network-based mobile payment type database (not shown in FIG. 2) to determine the mobile payment type(s) accepted by the identified merchant. As previously noted the network-based mobile payment type database is a comprehensive database that may be configured for dynamic update to reflect the current mobile payment types accepted by merchants. Such dynamic update may be accomplished via crowd sourcing, actual user/consumer transaction data, known merchant information provided by merchants or the like.

In other specific embodiments, the memory 106 of mobile communication device includes mobile payment database 124 that stores information regarding the mobile payment type 114 accepted by various merchants 116. The mobile payment database 124 may be configured to automatically capture mobile payment type 114 information based on mobile payment transactions conducted by the user. In addition, the mobile payment database 124 may be configured to receive user inputs that indicate the mobile payment type(s) 114 accepted by a merchant 116 (regardless of whether the user has conducted a mobile payment with the merchant). In further specific embodiments of the module, determination of the mobile payment type(s) accepted by a merchant may provide for accessing the mobile payment database 124 to make a determination as whether the database 124 includes mobile payment type 114 information for the merchant 116 of interest and, if the database 124 does not include information pertaining to the merchant 116 of interest, subsequently communicating with the network-based comprehensive mobile payment type database to determine the mobile payment type (s) 114 accepted by the merchant 116 of interest.

The mobile payment activation module 108 is further configured to automatically activate one or more mobile payment mechanisms 112 associated with one of the mobile payment types 114 accepted by the identified merchant 116. The mobile payment mechanisms 112 may include hardware, such as image capture device 126, short-range communication device 128 or the like. Additionally, the mobile payment mechanisms 112 may include software (e.g., module, routines, applications, tools or the like), such as mobile-payment type-specific applications 130 each associated with a specific mobile payment type. For example, an image/code capture mobile payment application, a short-range wireless/NFC mobile payment application and the like. It should be noted that the mobile payment mechanisms shown and described are merely examples and, as such, the inventive concepts herein disclosed provide for automatically activating any known or future known mobile payment mechanisms as they pertain to a known or future-known mobile payment type. Thus, for mobile payment types involving short range wireless communication automatic activation may include activating the short range wireless broadcast device and launching the associated payment application that alerts the user that the broadcast device has been activated for communicating payment information to the merchant and/or provides instructions for "tapping" the mobile communication to POS terminal to communicate the payment information from the mobile device to the POS terminal. For mobile payment types involving capture of computer readable-indiciad-indicia automatic activation may include activating the image capturing device and/or the application associated with image capture and launching the associated payment application that instructs the user to capture the requisite computer readable-indicia, displayed at the payment terminal or the like, to initiate the payment process.

The mobile payment activation module 110 may, in some embodiments, additionally include user configuration interface 132 configured to provide for the user to configure automatic activation of mobile payment mechanisms. In specific embodiments, the user configuration interface 132 is configured to allow the user to define mobile payment type preference(s) 134. Mobile payment type preferences 134 may provide for the user to define a preferred mobile payment type to be activated in the event the merchant accepts more than one mobile payment type. In other embodiments the module 110 may be configured to display a prompt (not shown in FIG. 2) on the mobile communication device prior to automatically activating the mobile payment mechanisms. The prompt may be configured to provide for the user to select from amongst two or more mobile payment types accepted by the merchant or to confirm or override the mobile payment type preference 134 previously configured by the user.

FIG. 3 is a high-level flow diagram of a method 200 for automatically activating mobile payment mechanisms in response to determination of the mobile payment type(s) accepted by a merchant. In accordance with embodiments of the present invention. At Event 210, a merchant is identified at which a user, in possession of a mobile communication device, is currently located or is close to in proximity. In such embodiments the mobile communication device may implement location-determining mechanisms to determine a geographic location of the device and access a database to identify a merchant located at the geographic location. In other embodiments of the invention, the merchant may be identified by user input.

At Event 220, one or more mobile payment types accepted by the identified merchant are determined. In certain embodiments, the determination of mobile payment type(s) accepted by the merchant is conducted by accessing a network-based mobile payment type database that is configured to map merchants to their known accepted merchant payment types. In other embodiments, the determination of mobile payment type(s) accepted by the merchant is conducted by accessing a locally-stored merchant payment type database on the mobile communication device. The locally-stored merchant payment type database may be configured to automatically store mobile payment type(s) accepted by a merchant based on a user conducting a mobile payment transaction with the merchant. In other embodiment, the determination of mobile payment type(s) accepted by the merchant may look first to the locally-stored merchant payment type database and, if the merchant payment type of the merchant of interest is not found in the locally-stored database, access the network-based merchant payment type database.

At Event 230, in response to determination of the mobile payment type(s) accepted by a merchant, one or more mobile payment mechanisms are automatically activated on the mobile communication device. For example, related mobile payment type-specific software/modules may automatically be launched and/or hardware may be activated. Such as image capture device, short-range-wireless device and the like. In the event that the merchant has been determined to accept more than one mobile payment type and the mobile communication device is configured to implement two or more of the mobile payment types accepted by the merchant, the user or the merchant may have predefined a preferred mobile payment type. In other embodiments of the method, a prompt may be displayed to the user prior to automatic activation of the mobile payment mechanisms, requiring the user select one of the mobile payment types accepted by the merchant, confirm a preference, or override a preference with a current selection of a mobile communication type.

Thus, as described in above, systems, devices and computer program are defined that provide for automatic activation of mobile payment mechanisms (e.g., software applications, devices/hardware and the like) on a mobile communication device in response to automated determination of the mobile payment types accepted by a merchant at which the user/consumer is located. As such, the present invention serves to automatically make the user/consumer aware of an option for mobile payment. In addition, the mobile payment transaction is made more efficient, in that, the user/consumer does not have to manually configure and/or activate the software or hardware associated with the mobile payment type.

While the foregoing disclosure discusses illustrative embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any embodiment may be utilized with all or a portion of any other embodiment, unless stated otherwise.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A mobile communication device configured for automated activation of mobile payment mechanisms, the mobile communication device comprising:
    a computing platform including a memory and at least one processor in communication with the memory; and
    a mobile payment activation module, executable by the processor and configured to:
        determine a geographic location at which the mobile communication device is currently located;
        identify a merchant associated with the geographic location of the mobile communication device;
        determine one or more mobile payment types accepted by an identified merchant by accessing a mobile payment type database that indicates the one or more mobile payments types accepted by the identified merchant, wherein a mobile payment type provides for a transaction to be facilitated using the mobile communication device as a payment vehicle, and wherein the mobile payment type is one of (1) a short-range wireless communication mobile payment type, or (2) an image-capturing mobile payment type; and
        in response to determination of the one or more mobile payment types, automatically, without user input, activate, on the mobile communication device, one or more mobile payment mechanisms associated with one of the determined one or more mobile payment types, wherein the mobile payment mechanism includes one of (1) a short-range wireless communication mechanism capable of broadcasting associated short-range wireless communication, or (2) an image capture mechanism capable of capturing computer-readable indicia displayed at a Point-of-Sale (POS) terminal.

2. The mobile communication device of claim 1, wherein the mobile payment activation module is further configured to determine that the merchant accepts two or more mobile payment types.

3. The mobile payment device of claim 2, wherein the mobile payment activation module is further configured to activate, on the mobile communication device, the one or more mobile payment mechanisms associated with a preferred mobile payment type, wherein the preferred mobile payment type is based on mobile communication device user configuration.

4. The mobile payment device of claim 2, wherein the mobile payment activation module is further configured to activate, on the mobile communication device, the one or more mobile payment mechanisms associated with a preferred mobile payment type, wherein the preferred mobile payment type is based on merchant preference.

5. The mobile payment device of claim 2, wherein the mobile payment activation module is further configured to display a prompt for a user to select one of the two or more mobile payment types accepted by the merchant, wherein user selection of one of the mobile payment types automatically activates at least one mobile payment mechanisms associated with the selected mobile payment type.

6. A system for automated activation of mobile payment mechanisms, the system comprising:
    a network-based mobile payment type database configured to store a listing of merchants and the one or more mobile payment types accepted by each merchant, wherein the mobile payment type is one of (1) a short-range wireless communication mobile payment type, or (2) an image-capturing mobile payment type; and
    a mobile communication device comprising a computing platform having a memory and at least one processor in communication with the memory, the mobile communication device including:
        a location-determining device configured to determine a current geographic location of the mobile communication device;
        a mobile payment activation module stored in the memory, executable by the processor and configured to:
            (1) identify a merchant associated with the current geographic location,
            (2) access the mobile payment type database to identify one or more mobile payment types accepted by the merchant, wherein a mobile payment type provides for a transaction to be facilitated using the mobile communication device as a payment vehicle, and wherein the mobile payment type is one of (1) a short-range wireless communication mobile payment type, or (2) an image-capturing mobile payment type, and
            in response to identifying the one or more mobile payment types, (3) automatically, without user input, activate one or more mobile payment mechanisms associated with one of the identified one or more mobile payment types, wherein the mobile payment mechanism includes one of (1) a short-range wireless communication mechanism capable of broadcasting associated short-range wireless communication, or (2) an image capture mechanism capable of capturing computer-readable indicia displayed at a Point-of-Sale (POS) terminal.

7. The system of claim 6, wherein the mobile payment type database is further configured to learn a mobile payment type associated with a merchant by one of merchant contact information, customer transactions or crowd sourcing.

8. The system of claim 6, wherein the mobile payment activation module is further configured to determine that the merchant accepts two or more mobile payment types.

9. The system of claim 8, wherein the mobile payment activation module is further configured to activate, on the mobile communication device, the one or more mobile payment mechanisms associated with a preferred mobile payment type, wherein the preferred mobile payment type is based on mobile communication device user configuration.

10. The system of claim 8, wherein the mobile payment activation module is further configured to activate, on the mobile communication device, the one or more mobile payment mechanisms associated with a preferred mobile payment type, wherein the preferred mobile payment type is based on merchant preference.

11. The system of claim 6, wherein the mobile payment activation module is further configured to display a prompt for a user to select one of the two or more mobile payment types accepted by the merchant, wherein user selection of one of the mobile payment types automatically activates at least one mobile payment mechanisms associated with the selected mobile payment type.

12. A computer program product comprising a non-transitory computer-readable medium comprising:
    a first of codes for causing a mobile communication device to determine a geographic location at which the mobile communication device is currently located and based on the determined geographic location identify a merchant associated with the geographic location;

a second set of codes for causing the mobile communication device to determine one or more mobile payment types accepted by an identified merchant by accessing a mobile payment type database that indicates the one or more mobile payments types accepted by the identified merchant, wherein a mobile payment type provides for a transaction to be facilitated using the mobile communication device as a payment vehicle, and wherein the mobile payment type is one of (1) a short-range wireless communication mobile payment type, or (2) an image-capturing mobile payment type; and a third set of codes for causing the mobile communication device, in response to determination of the one or more mobile payment types, to automatically, without user input, activate, on the mobile communication device, one or more mobile payment mechanisms associated with one of the determined one or more mobile payment types, wherein the mobile payment mechanism includes one of (1) a short-range wireless communication mechanism capable of broadcasting associated short-range wireless communication, or (2) an image capture mechanism capable of capturing computer-readable indicia displayed at a Point-of-Sale (POS) terminal.

13. The computer program product of claim 12, wherein the second set of codes is further configured to cause the mobile device to determine that the merchant accepts two or more mobile payment types.

14. The computer program product of claim 13, wherein the third set of codes is further configured to cause the mobile communication device to activate, on the mobile communication device, the one or more mobile payment mechanisms associated with a preferred mobile payment type, wherein the preferred mobile payment type is based on one of mobile communication device user configuration or merchant preference.

15. The computer program product of claim 12, further comprising a fourth set of codes for causing the mobile communication device to display a prompt for a user to select one of the two or more mobile payment types accepted by the merchant, wherein user selection of one of the mobile payment types automatically activates at least one mobile payment mechanisms associated with the selected mobile payment type.

\* \* \* \* \*